2,822,370

PREPARATION OF WHITE ACYL-PARA-AMINOPHENOLS

Delmer L. Cottle, Highland Park, and David W. Young, Westfield, N. J., assignors to Esso Research and Engineering Company, a corporation of Delaware No Drawing. Application July 22, 1954
Serial No. 445,177

5 Claims. (Cl. 260—404)

This invention relates to an improved process for preparing acyl p-aminophenols of higher molecular weight than acetyl p-aminophenol. The present invention is a continuation-in-part of Serial No. 278,114, filed March 22, 1952, now U. S. Patent 2,711,415, issued June 21, 1955.

Acyl p-aminophenols of higher molecular weight than acetyl-p-aminophenol have been finding ever-increasing utility as anti-oxidants for relatively non-volatile organic materials which normally tend to deteriorate in storage due to undesirable oxidation reactions. The effect of these stabilizers is described at length in U. S. Patent 2,654,722, issued October 6, 1953.

The acyl p-aminophenols are usually prepared by a condensation reaction which comprises reacting a stoichiometrical amount of a monocarboxylic acid or its derivative, i. e. anhydride, acid chloride, etc. in the presence of an entraining solvent such as benzene, toluene, xylene and the like, with para aminophenol. The solid reaction product was then dehydrated by evaporation.

It is to be understood that wherever the term "monocarboxylic acid derivative" is used hereafter and in the claims, this term also connotes the indicated monocarboxylic acid derivatives which are equivalent to the acids themselves and can be utilized in the indicated condensation reaction.

An improved process for preparing these amides involves the use of boric acid as a catalyst, as described in U. S. application Serial No. 278,114, filed March 22, 1952, now U. S. Patent 2,711,415, issued June 21, 1955. There the amine is heated with an organic acid, preferably a carboxylic acid, in the presence of the boric acid catalyst, and a product of improved yield and color is recovered.

The process of the present invention relates to the purification of the p-acyl-aminophenol. It has in the past been a matter of great difficulty to obtain p-aminophenol, an intermediate in the preparation of dyes, in a white and pure form. The products of the reaction consequently also are colored. The products also are further colored by undesirable degradation reactions which take place during the course of the rather long reaction. The obtaining of a colored product is completely undesirable in view of the fact that the anti-oxidants find extensive use in clear resins and plastics which cannot tolerate colored additives.

This inventon provides a method of preparing acyl-p-aminophenols of higher molecular weight than acetyl p-aminophenol free of the above-mentioned difficulties. It has, in the past, been suggested dissolving the reaction product in relatively anhydrous isopropyl alcohol, adding water, and allowing the acyl-p-aminophenol to crystallize. Though this process produces initially a white product, it is accompanied by certain disadvantages. Not only is there a yield loss in the course of the crystallization and recrystallization, but also a large number of processing steps are required, including filtration and fractional distillation facilities, particularly for separating entrainer from the crystallization medium. This serves to keep processing costs high. Furthermore, recrystallization has not in all cases assured that the product remains white during storage, i. e. that it is light-stable.

The present invention provides a method of preparing acyl-p-aminophenols of higher molecular weight than acetyl p-aminophenol free of these before-mentioned difficulties, and substantially more economically than these practiced hitherto. The method of this invention comprises, in essence, the removal of aromatic entrainer solvent from the condensation product by a process such as steam distillation and thereafter adding a very dilute hot aqueous alkaline solution, such as NaOH, KOH, $Na_2CO_3$, and the like, in concentrations of 5 cc. to 40 cc. of about 2.5–20%, and preferably about 10% by wt. of alkali in water per 100 grams of acyl-p-aminophenol to the resulting slurry. This treatment serves to make soluble in water the dye that makes the acyl amino phenols off color, and under these conditions it is washed from the sample with ease, obviating the need for any crystallization. A white, light-stable product is recovered by simple filtration. As the data discussed subsequently show, the amount and extent of caustic employed in the wash is critical.

Thus the amide compounds may be prepared, for example, in the case of acyl p-aminophenols by heating the carboxylic acid with the amine in the presence of a water-entraining solvent such as benzene, toluene, or xylene, with p-aminophenol, using the expressed amounts of boric acid. The amide product, in the form of an aqueous slurry, is then washed with the aqueous alkaline solution. This serves also to remove any traces of boric acid by utilizing its preferential water solubility or salt forming tendency. The acyl p-aminophenols need no recrystallization from isopropyl alcohol or any other solvent. The products are free of boric acid and from any deleterious effects due to its use.

The amides prepared by the process of this invention are, as is well known, compounds derived from carboxylic acids by the replacement of the OH group by $NH_2$. The process is also particularly applicable to the preparation of substituted amides, e. g., those in which the nitrogen is also linked to an aromatic nucleous such as acyl p-aminophenols. The aromatic nucleus in turn can be further substituted.

The acids particularly preferred for utilization in the reaction of this invention are the monocarboxylic acids having from 2 to 21 carbon atoms. Typical acids are thus butyric ($C_4$); caproic ($C_6$); caprylic ($C_8$); capric ($C_{10}$); lauric ($C_{12}$); myristic ($C_{14}$); palmitic ($C_{16}$); stearic ($C_{18}$); undecylenic ($C_{11}$=); oleic ($C_{18}$=); linoleic ($C_{18}$==); benzoic; cyclohexylvaleric ($C_{11}$); cyclohexylcaproic; $C_8$ oxo acids; $C_9$ oxo acids; $C_{13}$ oxo acids; naphthenic acids; and the rosin acids.

The amines utilized to prepare the water-insoluble amides can be aliphatic or aromatic. The aliphatic amines, which can be primary or secondary, preferably contain no more than 50 carbon atoms and include amines such as 3,3′-iminobispropylamine

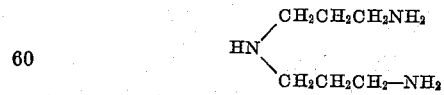

methylamine, dimethylamine, ethylamine, diethylamine, n-propylamine, di-n-propylamine, n-butylamine, n-amylamine, n-hexylamine, laurylamine, ethanolamine, and diethanolamine. Among the aromatic amines that can be used are aniline, methylaniline, o-toluidine, m-toluidine, p-toluidine, o-nitroaniline, m-nitroaniline, p-nitroaniline, o-anisidine, p-anisidine, p-phenetidine, and diphenylamine. The aromatic amines which are particularly suitable and preferred for utilization in this invention are p-aminophenol and its alkylated derivatives.

The following examples illustrate the invention and the preparation of the indicated compound.

Example I

One mole of p-aminophenol was placed in a glass round-bottomed flask fitted with a reflux condenser with an azeotropic take-off arm. There was added to the flask one mole of stearic acid and about 150 cc. of xylene. The xylene served as an entraining agent for the water formed during the course of the reaction. The flask was then heated to the xylene reflux temperature and kept at that temperature for about 9 hours, or until 86% of the theoretical water (1 mole) had been removed. The contents of the flask was then emptied into an evaporating dish and heated on a steam bath. The mixture was well agitated and divided into three equal parts. Part one was placed in 500 cc. of glacial acetic acid and heated for 1 hour on the steam bath. Then this sample was diluted with distilled water until the concentration of the acid was 15%. The mixture was cooled to 20° C., and filtered. The yield of product after washing with 5 l. water was 74%. This product upon drying had a Gardner Reflection of 88%, as measured in a Gardner Reflectometer. The second part was placed in 500 cc. of 98% isopropyl alcohol, heated to boiling, diluted until the alcohol content was 50% by volume, the product filtered and then washed with water. Upon drying the yield of product was 78% by wt. This material had a Gardner Reflection of 90%—being slightly whiter than the acetic acid sample. The third part was treated with 15 cc. of 10% NaOH and agitated well on the steam plate for 15 minutes, then the material was filtered through paper, like the others, washed with 5 l. water, like the other tests, and dried. This yield was 94% and the product had a Gardner Reflection of 94.

After a period of 6 months the Gardner Reflection was once again determined to determine how white the samples held. Results are listed.

|                    | Acetic Acid Product | Alcohol Product | Alkali Product |
|--------------------|---------------------|-----------------|----------------|
| Gardner Reflection | 63                  | 72              | 94             |

These data show clearly not only that initially the product prepared by the process of the invention had a whiter color, but also that the product retained its whiteness for at least a 6 month period. The recrystallized materials were not color-stable.

Example II

Fifty grams of a 50/50 mixture of N-stearoyl p-aminophenol and toluene was melted (M. P. ca. 100° C.), covered with 300 cc. of boiling water, stirred in order to break up the precipitate into small particles and steam distilled. After removal of the toluene, 18 cc. of 10% sodium hydroxide was added, the mixture stirred for 5 minutes, then held at 90° C. for 5 minutes, allowed to cool to 80° C. and filtered on a Buchner funnel. The filter cake was washed with 1 l. of boiling water. The yield of white product, M. P. 125–128° C., was 72% based on the reactants.

Example III

A similar experiment with 9 cc. of 10% sodium hydroxide gave an 87% yield of a white product, M. P. 124–128° C. Another experiment with 9 cc. of sodium hydroxide and 150 cc. of water gave a white product of M. P. 124–126° C. The filtration rate appeared to be satisfactory in all three experiments. The original color of the starting material was brown—due to traces of p-aminophenol which discolors readily on storage or handling.

The alkali concentration and amount employed is important. Employing less than the amount indicated will not make the blue-colored dye impurity soluble in water. Above these amounts, the product is very difficult to handle as it becomes a slime; furthermore, the dye is not as soluble in the water wash.

What is claimed is:

1. In a process for the preparation of a substantially dye free acyl p-aminophenol corresponding to the general formula

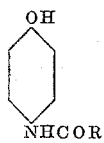

where R is a hydrocarbon radical having from one to twenty carbon atoms, which comprises condensing p-aminophenol with about a stoichiometrical amount of an organic monocarboxylic acid having from two to twenty-one carbon atoms, the improvement which comprises washing the resulting dye-containing reaction product with 5 to 40 cc. per 100 grams of the acyl p-aminophenol of an aqueous solution containing 2.5 to 20 weight percent of an alkali, and recovering a light-stable and color-stable product.

2. In a process wherein p-aminophenol is condensed with about a stoichiometrical amount of an organic monocarboxylic acid having from two to twenty-one carbon atoms to produce the corresponding substantially dye free acyl p-aminophenol, the improvement which comprises carrying out said condensation in the presence of a catalytic amount of boric acid and of an inert water-entraining agent, removing water by means of said entrainer, removing said entrainer, thereafter adding an aqueous solution containing about 2.5 to 20 weight percent of sodium hydroxide to the resulting dye-containing condensation product in a proportion of 5 to 40 cc. of aqueous solution per 100 grams of the acyl aminophenol, and recovering without recrystallization from a solvent a white, light-stable and color-stable acyl p-aminophenol.

3. The process of claim 2 wherein said acid has at least eleven carbon atoms.

4. The process of claim 2 wherein said acid is stearic acid.

5. The process of claim 2 wherein a 10% aqueous NaOH solution near its boiling point is employed as a washing solution for said acyl p-aminophenol.

References Cited in the file of this patent

UNITED STATES PATENTS

| 2,367,010 | Davis et al. | Jan. 9, 1945 |
| 2,384,811 | Coleman et al. | Sept. 18, 1945 |
| 2,534,204 | Mowry | Dec. 12, 1950 |
| 2,625,557 | Cottle et al. | Jan. 13, 1953 |
| 2,653,157 | Ursprung | Sept. 22, 1953 |
| 2,710,299 | Kottler et al. | June 7, 1955 |
| 2,730,500 | Young et al. | Jan. 10, 1956 |